United States Patent [19]
Pecorini

[11] Patent Number: 4,518,184
[45] Date of Patent: May 21, 1985

[54] DEVICE FOR REMOTELY PASSING A CORD IN OR AROUND AN ANCHORING MEMBER

[76] Inventor: Claude Pecorini, 2/11 Rue des Bugnons, CH-1217 Meyrin, Geneva, Switzerland

[21] Appl. No.: 442,797

[22] Filed: Nov. 18, 1982

[30] Foreign Application Priority Data

Nov. 27, 1981 [CH] Switzerland .................. 7584/81
May 10, 1982 [CH] Switzerland .................. 2903/82

[51] Int. Cl.³ ............................................. B63B 21/04
[52] U.S. Cl. ................................ 294/19.1; 114/221 R; 114/230
[58] Field of Search .............. 294/19 R, 19 A, 83, 294/1 R, 82 R; 114/221 R, 230; 9/14; 83/5; 119/153, 154, 151

[56] References Cited

U.S. PATENT DOCUMENTS

| 2,347,718 | 5/1944 | Terry | 114/230 |
| 2,730,985 | 1/1956 | Wingate | 294/19 R |
| 3,813,122 | 5/1974 | Wemyss | 294/19 R |

FOREIGN PATENT DOCUMENTS 587144 4/1977 Switzerland .................. 294/19 R

*Primary Examiner*—James B. Marbert
*Attorney, Agent, or Firm*—Young & Thompson

[57] ABSTRACT

The device for remote passing a cord in or around an anchoring member comprises a support (1) on the end of which a slide (2) is fastened as well as a sliding block (3) sliding in the slide. The sliding block (3) has a length at least equal to twice that of the slide (2) increased by the width of a notch (8) provided in the sliding block. The sliding block (3) comprises at at least one of its ends, fixing means (6, 7) for the cord. A locking mechanism (9 to 18) is provided to fix either temporarily or permanently the position of the sliding block (3) with respect to the slide (2). The introduction into the notch (8) of an anchoring member displaces the lever (12) of the locking mechanism, when it is in its temporary locked position, and frees the sliding block from the slide which can slide up to the other end of the notch (8). In this manner a cord fixed to the sliding block (1) is passed around the anchoring member.

10 Claims, 9 Drawing Figures

DEVICE FOR REMOTELY PASSING A CORD IN OR AROUND AN ANCHORING MEMBER

The present invention has for its object a device for passing a rope or a cord around a member such as the branch of a tree, a fixed bar, an anchoring ring, a buckle of an anchor buoy or of a dead weight, rod of a ladder etc. which is not accessible for the user.

There are a certain number of such devices, more particularly intended for navigation, which are described in the introduction of CH patent application No. 7584/81 dated Nov. 27, 1981.

The present invention is an improved variant of the device described in said patent application and is also intended for other uses such as those related to navigation.

This device according to the invention is characterised by the fact that it comprises a support on the end of which a slide is fastened as well as a sliding block sliding in said slide; and by the fact that the sliding block has a length greater than twice that of the slide and that it comprises at one end at least, means for fixing a cord.

The attached drawing shows schematically and by way of example one embodiment of the device according to the invention.

Figure 1:
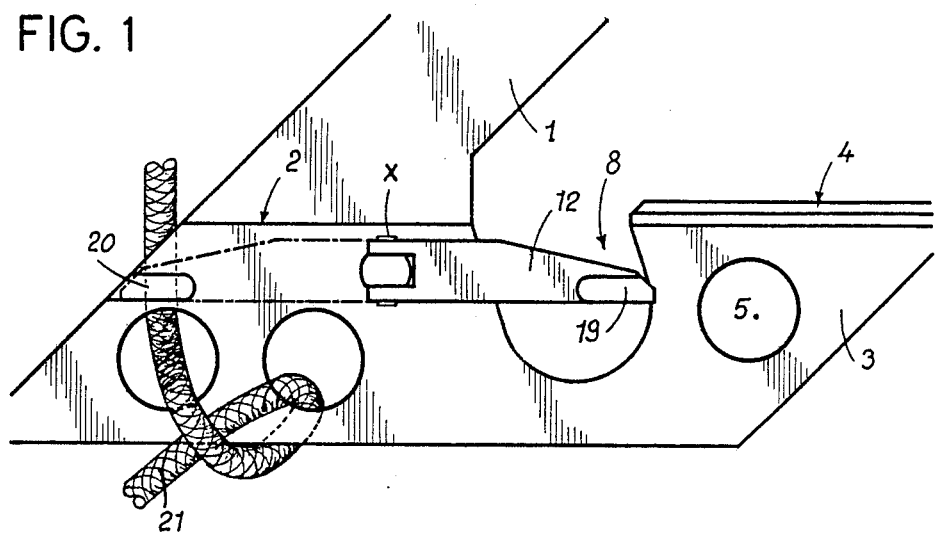
FIG. 1 is a partial side view of it.

The device shown for remotely passing a cord in or around an anchoring member comprises a support 1, which can have the shape of a handle for example, the end of which is provided with a slide 2 or slide rail.

The device comprises further a sliding block 3 one edge 4 of which comprises a formation corresponding to the slide 2 and cooperating with it. The sliding block 3 can thus slide in the slide 2 and have different positions with respect to the support. The formation carried by the edge 4 of the sliding block 3 has abutments at its ends limiting the displacements of the sliding block 3 with respect to the slide 2.

The sliding block has at at least one of its ends fixing means for a cord, provided in the example shown by one hole 5 or two holes 6, 7. The use of two holes 6, 7 for fixing a cord to the sliding block enables securement without knots, by simple passage of the cord in the first hole 7, around the edge of the sliding block and then passing said cord in the second hole 6. One obtains thus an auto-wedging of the cord on the sliding block 3.

The sliding block 3 comprises further, opening on it edge which is directed towards the support 1, a notch 8 the axis xx of which forms an angle α with the axis yy of the sliding block 3. This angle is less than 90° so that this notch is, in the working position shown, sloped towards the support 1, which facilitates the disengagement from an anchoring member.

The length of the sliding block 3 is greater than twice that of the slide 2 by an amount at least equal to the width of the notch 8 so that said notch can be located on either side of said slide.

In a variant it is evident that the slide 2 and the corresponding edge 4 of the sliding block could be arcuate, which enables in certain cases a better handling of the device. For example the slide can be concave and the sliding block convex.

The device shown comprises further a locking mechanism of the sliding block on the slide in its initial service position.

This locking mechanism comprises a lock 9 pivoted on the sliding block 3 about in axle 10 and provided with a beak 11 adapted to cooperate with a recess provided in the support 1.

On the opposite face of the sliding block 3 there is a control lever 12 hinged at X on a pivot 13 journaled in a housing 14 of the sliding block. This pivot 13 comprises a plate 15 subjected to the action of a spring 16 acting angularly as well as axially on the pivot 13. The plate 15 of the pivot 13 comprises a notch 17 cooperating with a stud 18 fast with the lock 9.

To permanently lock the sliding block 3 on the support 1, the operator pivots the control lever 12 around its axis X so that its stud 19 comes into a notch 20 of the sliding block thereby to prevent pivoting of the lever 12 around the axis of the pivot 13 and thus any unlocking of the sliding block with respect to the support. During this pivoting, the spring 16 is compressed axially and then stretched again. The lever 12 is thus maintained by the action of this spring 16 in its two working positions.

Figure 2:
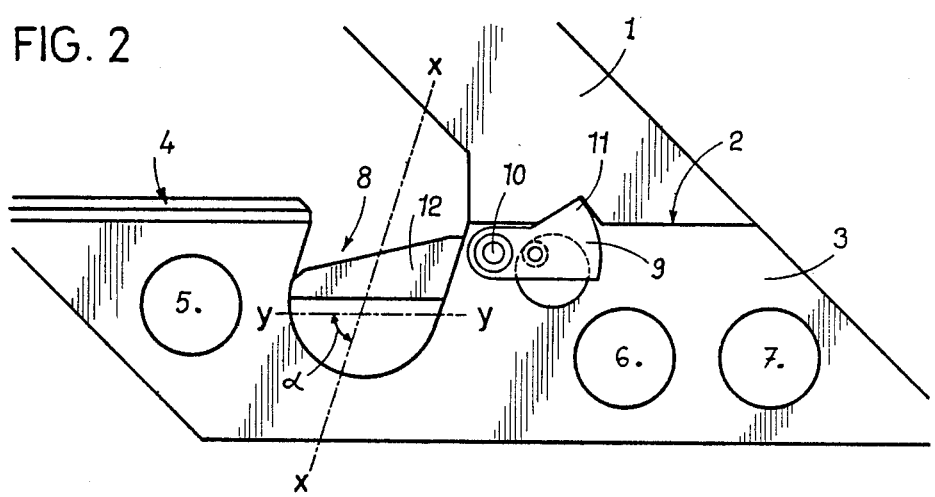
FIG. 2 is a partial side view of it taken from the other side.
Figure 3:
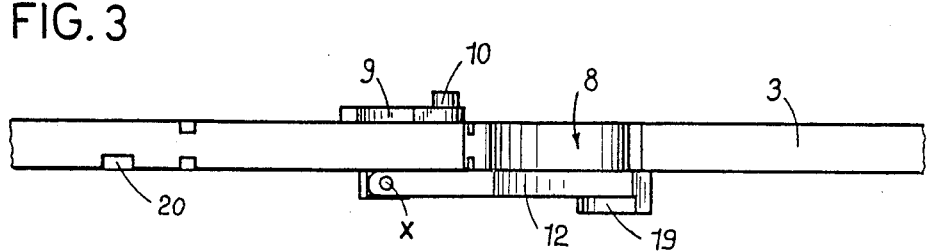
FIG. 3 is a top view of it, the support and the slide being omitted.
Figure 4:
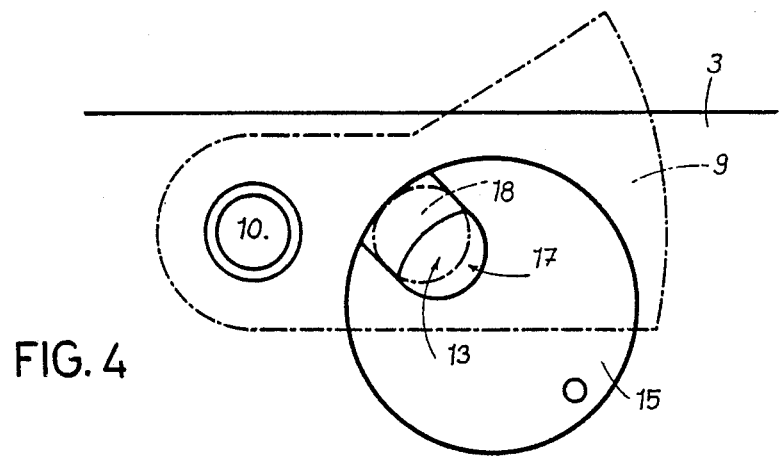
FIGS. 4 and 5 are details showing a part of a locking mechanism in active respectively inactive position.
Figure 5:
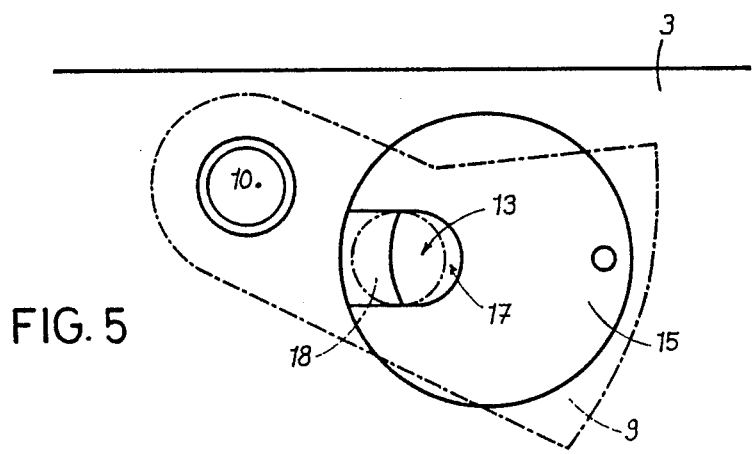
Figure 6:
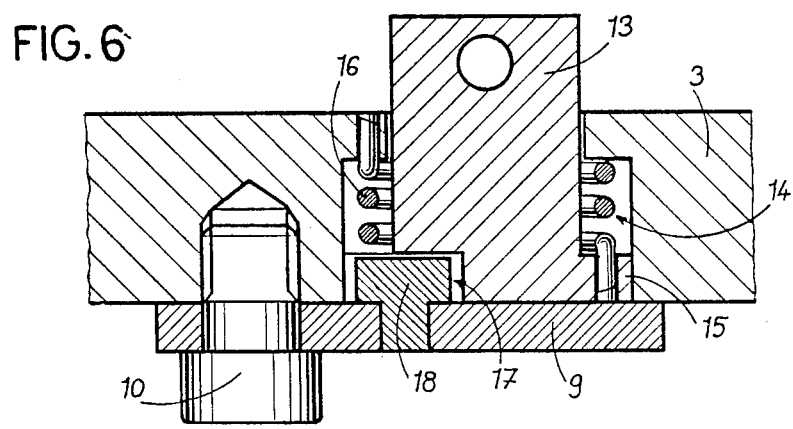
FIG. 6 is a cross-section showing the locking mechanism.

When the control lever 12 is in its position shown in FIGS. 1 and 2, the operator can introduce an anchoring member into the notch 8, causing the displacement of the lever 12 and therefore the pivoting of the pivot 13 against the torsion of the spring 16 and causing the unlocking of the lock 9. The sliding block can be displaced into the slide which pass on the other side of the notch 8 and thus of the anchoring member housed therein, so that a cord in holes 6, 7 can then be pulled through or around this anchoring member.

It is to be noted that the angular displacement of the pivot 13 takes place against the action of the spring 16 and that the axial displacement of this pivot caused by the tilting of the lever 12 around its axis X also takes place against the action of spring 16.

It is to be noted that a rope or cord 21 can be fixed without knots to the sliding block by means of the holes 6, 7 as shown in FIG. 1.

According to the shape and dimension of the sliding block 3 and of its notch 8, one can by means of this device pass the cord 21 through a ring or around a branch or any other anchoring member.

The shape and the orientation of the notch 8 of the sliding block 3 can also be modified as a function of the nature of the cord and of the anchoring member to facilitate the operation of passage of the cord.

The support 1 can simply fit on the extremity of a handle, but can also be fixed on a hinged arm the displacements of which are remote controlled.

Figure 7:
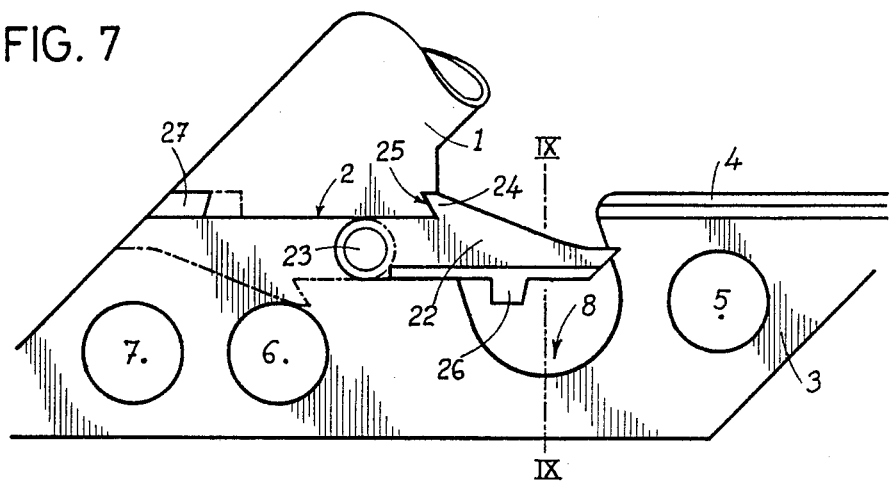
FIGS. 7 and 8 show a second embodiment of the locking mechanism.
Figure 8:
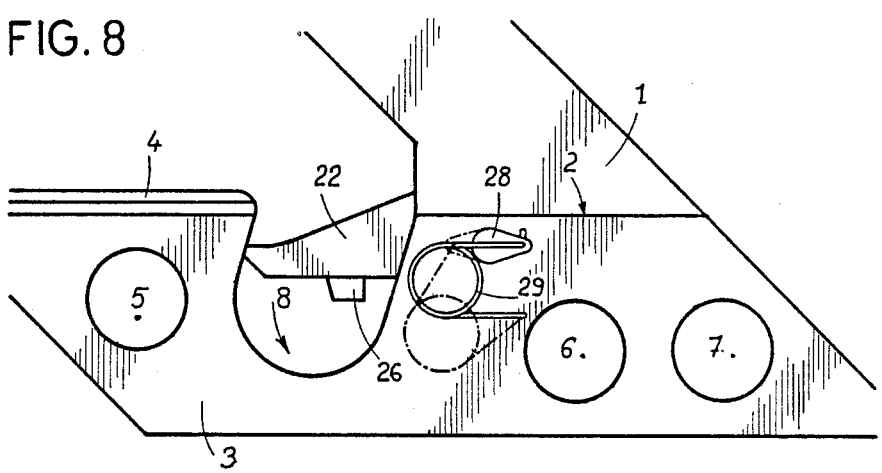
Figure 9:
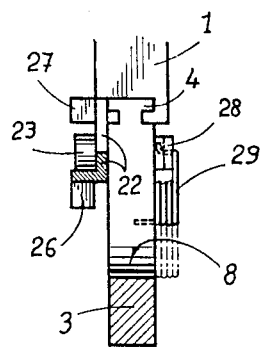
FIG. 9 is a cross-section along line IX—IX of FIG. 8.

FIGS. 7 to 9 show a second embodiment of the locking mechanism of the sliding block 3 on the slide 2.

The sliding block 3 is slidably mounted on the slide 2 of the support through a slide rail 4 as in the first embodiment. The sliding block 3 comprises also a notch 8 intended to receive an anchoring member. The axis of this notch is inclined towards the support 1 (FIG. 7), to facilitate the separation of the anchoring member from this notch after the displacement of the slide.

The locking mechanism of the sliding block 3 on the slide 2 comprises a lever 22 fast with a shaft 23 passing through the sliding block 3. This lever extends in temporarily locking position (FIG. 7) through the notch 8 and comprises a beak 24 forming a lock which in said position is engaged in a notch 25 having a corresponding shape, provided in the slide 2.

On its back face, the lever 22 has an abutment 26 cooperating, in permanent locking position with a lug 27 of the slide 2.

The shaft 23 is provided at its end emerging from the other side of the sliding block 3 with an excenter 28. A spring 29 having three or four turns is fixed by one of its ends to the end of the excenter 28 and through its other end to the sliding block 3.

This spring 29 enables maintaining the lever 22 either in its position shown in FIG. 8, for temporary locking, or in its position shown in dotted lines in FIG. 7 for the permanent locking of the sliding block 3 on the support 1.

In the temporary locking position, the introduction of an anchoring member in the notch 8 displaces the lever 22 and unlocks thus the sliding block 3 from the support 1. The support can slide until the slide 2 is completely located on the other side of the notch 8, then the operator can through the application of traction pass the cord which is fixed to the sliding block by means of the holes 6, 7, through the anchoring member.

On the contrary, when the lever 22 is in its other stable position, its abutment 26 being then against the lug 27 of the support, any relative displacement between the sliding block 3 and the support 1 is prevented.

What I claim is:

1. Device for remotely passing a cord in or around an anchoring member, comprising a support on the end of which a slide is fast as well as a sliding block sliding linearly in said slide; the sliding block having linear sliding surfaces on opposite sides of a notch that opens toward said support; the sliding block having a length greater than twice that of the slide by an amount equal at least to the width of said notch and comprising, at at least one of its ends, fixing means for the cord.

2. Device according to claim 1, in which the sliding rail of the slide is rectilinear as is also the corresponding formation of the sliding block.

3. Device according to claim 1, in which the fixing means of the cord to the sliding block are provided by two holes in said sliding block in the vicinity of one of its ends.

4. Device according to claim 1, in which said notch is sloped, in initial service position, towards the end of the support carrying the slide.

5. Device according to claim 4, which comprises a locking mechanism of the sliding block with respect to the slide having a lock mounted on the sliding block and provided with a beak cooperating with a recess in the slide.

6. Device according to claim 5, and a control lever connected to a pivot journaled on the sliding block, said pivot comprising a slot cooperating with a lug fast with the lock.

7. Device according to claim 6, in which the control lever is hinged on the pivot along an axis perpendicular to the axis of said pivot, and a spring between the pivot and the sliding block to maintain the pivot in a desired axial and angular position with respect to the sliding block.

8. Device according to claim 7, in which the free end of the control lever comprises a lug adapted to cooperate with a recess in the sliding block to avoid any angular displacement of the pivot.

9. Device according to claim 5, in which the lock is fast with a control lever fixed to a shaft pivoted in the sliding block, this shaft having an eccentric the end of which is connected through a spring having several turns to the sliding block.

10. Device according to claim 9, in which the back face of the lever comprises an abutment adapted to cooperate with a lug of the support to lock the sliding block on the support.

* * * * *